United States Patent Office.

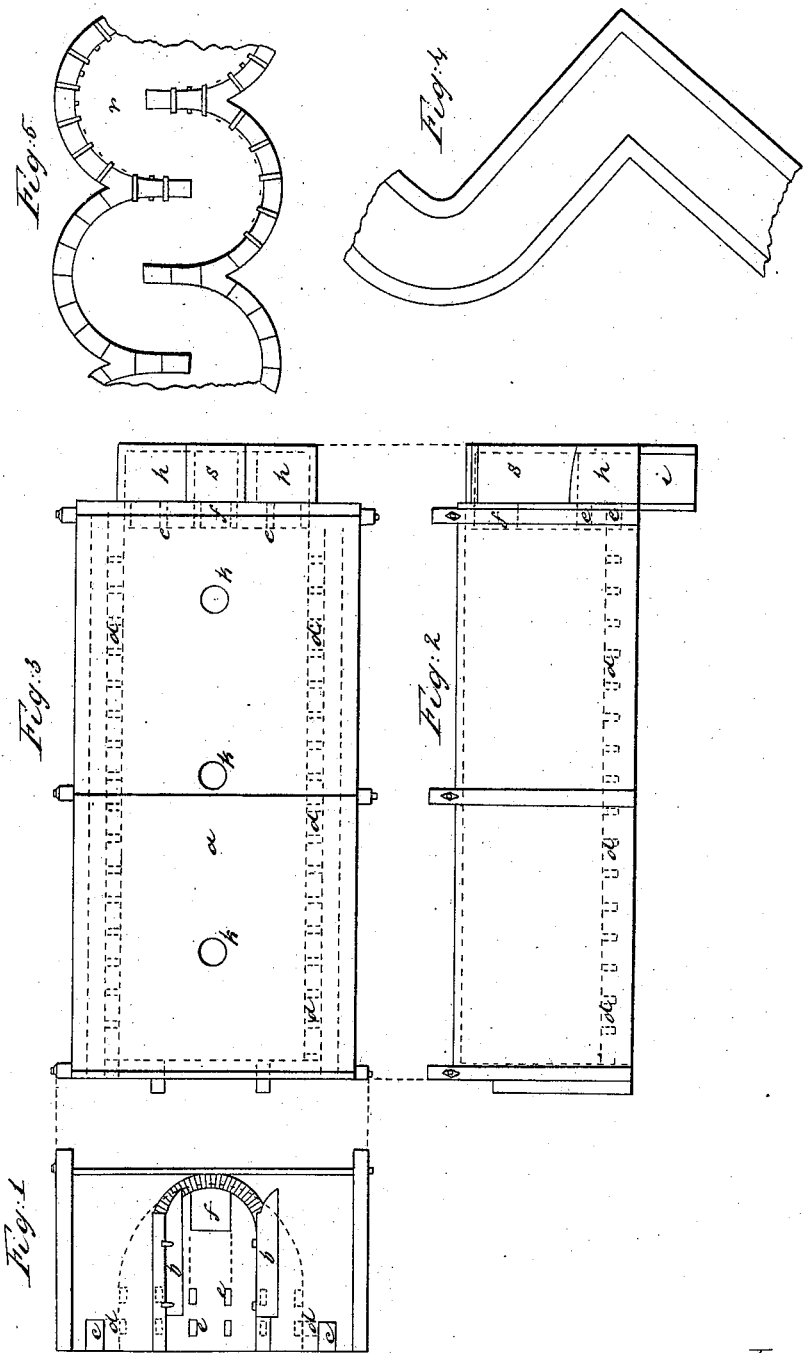

JOHN T. REESE, OF BALTIMORE, MARYLAND.

Letters Patent No. 63,094, dated March 19, 1867.

IMPROVED STALL FOR ROASTING ORES CONTAINING SULPHUR, &c.

*The Schedule referred to in these Letters Patent and making part of the same.*

TO ALL WHOM IT MAY CONCERN:

Be it known that I, JOHN T. REESE, of Baltimore, in the county of Baltimore, in the State of Maryland, have invented a new and improved Stall for the Purpose of Roasting Ores Containing Sulphur, Arsenic, Antimony, and other minerals that are detrimental to the work of smelting their chief metal, and, at the same time, so to conduct the gases thence arising, through a series of ports and culverts, as to collect the injurious minerals in sediment, and utilize the same; and I do hereby declare that the following is a full and exact description thereof, reference being had to the accompanying drawings, and to the letters of reference marked thereon, forming a part of this specification, in which—

Figure 1 is a front elevation of ore stall.
Figure 2 is a side view.
Figure 3 is a top view.
Figure 4 is a ground plan of main culvert.
Figure 5 is a ground plan of another form of main culvert.

In the drawings, $a$ is an arch, which forms the entire roof of the stall; $b\ b$ are the doors; $c\ c$ are the draught channels; $d\ d$ are draught ports; $e\ e$ are the lower fume ports; $f$ is the upper fume port; $s$ is the stall stack; $h$ is the stall culvert; $k\ k$ are charge ports. In small stalls the draught channels and draught ports $c\ c\ d\ d$ may be omitted.

Operation.

The fuel is placed upon the floor of the stall, which is then charged with ore through the ports $k\ k$. These ports and the doors $b\ b$ are then closed, and the charge is fired in front. A sufficient draught is afforded in front by the open space below the doors, and at the sides by admitting air through the channels $c\ c$, and thence through the ports $d\ d$. As the fumes arise from the mass of roasting ore, the roof $a$ prevents their escape, and they pass through the ports $e\ e$ and $f$ to the stack $s$ and culvert $h$, and thence, through a branch culvert, as at $i$, to the main culvert and main stack. In its passage through the main culvert the numerous bends, whether forming obtuse angles, as shown in fig. 4, or more abrupt turns, as shown in fig. 5, and rough surfaces of its walls, as shown at $r$, fig. 5, or obstructions placed directly across the culvert in the form of iron grates or wire cloth, all serve to collect the valuable sediment from the fumes, thereby preventing them from poisoning the atmosphere, besides turning them to pecuniary advantage. By this process the roasting is thorough, saving a large percentage in cost of furnace roofs, of labor, of fuel, in time and processes of the subsequent smelting of the ore, together with a gain of fifty per cent., or more, in the purity and value of the metal produced over and above that produced by the old process of roasting, while a saving of more than fifty per cent. in cost of stalls, and eighty-five per cent. in fuel, is effected in this process of roasting alone. In the old process of roasting, the stall has no doors nor roof. Its walls were perforated from top to bottom, the holes either serving to admit air or discharge the fumes, as controlled by the currents of hot or cold air and gases, while the escape of fumes poisoned the atmosphere, and wasted the volatile but valuable minerals.

Claims.

What I claim as my invention, and desire to secure by Letters Patent, is—

An ore stall with a roof, $a$, by arch or otherwise; a closed front by doors $b\ b$; the arrangement of draught ports $d\ d$; the arrangement of fume ports $e\ e$ and $f$; the connection of stack $s$ and culvert $h$ with culvert $i$ and main culvert and stack; this process of confined roasting; a long and crooked main culvert; and the process of securing sediment by the bends, the rough walls, or the obstructions in the culverts.

JOHN T. REESE.

Witnesses:
THOMAS MORRIS,
DAVID MORRIS.